(12) United States Patent
Carriere Lluch

(10) Patent No.: US 11,759,292 B2
(45) Date of Patent: Sep. 19, 2023

(54) ORTHODONTIC DEVICE

(71) Applicant: ORTHODONTIC RESEARCH AND DEVELOPMENT, S.L., Barcelona (ES)

(72) Inventor: Luis Carriere Lluch, Barcelona (ES)

(73) Assignee: ORTHODONTIC RESEARCH AND DEVELOPMENT, S.L., Barcelona (ES)

( * ) Notice: Subject to any disclaimer, the term of this patent is extended or adjusted under 35 U.S.C. 154(b) by 0 days.

(21) Appl. No.: 17/568,616

(22) Filed: Jan. 4, 2022

(65) Prior Publication Data

US 2022/0125555 A1 Apr. 28, 2022

Related U.S. Application Data

(63) Continuation of application No. PCT/EP2021/061431, filed on Apr. 30, 2021.

(51) Int. Cl.
*A61C 7/22* (2006.01)
*A61C 7/14* (2006.01)

(52) U.S. Cl.
CPC .......... *A61C 7/22* (2013.01); *A61C 7/14* (2013.01); *A61C 2201/007* (2013.01)

(58) Field of Classification Search
CPC .................... A61C 7/20; A61C 7/22
See application file for complete search history.

(56) References Cited

U.S. PATENT DOCUMENTS

| | | | | |
|---|---|---|---|---|
| 2,406,527 A | * | 8/1946 | Berke | A61C 7/12 433/20 |
| 2,705,367 A | * | 4/1955 | Berke | A61C 7/12 433/20 |
| 3,593,421 A | * | 7/1971 | Brader | A61C 7/20 433/21 |
| 3,803,715 A | * | 4/1974 | Wallshein | A61C 7/12 433/18 |
| 3,896,549 A | * | 7/1975 | Wallshein | A61C 7/12 433/18 |

(Continued)

FOREIGN PATENT DOCUMENTS

WO WO 2020/223714 A1 11/2020

OTHER PUBLICATIONS

International Search Report and Written Opinion for International PCT Application No. PCT/EP2021/061431, 9 pages, dated Jul. 6, 2021.

(Continued)

*Primary Examiner* — Ralph A Lewis
(74) *Attorney, Agent, or Firm* — SQUIRE PATTON BOGGS (US) LLP (57) ABSTRACT

An orthodontic device (10) comprising, a first opening (11) for receiving a first anchoring structure, a second opening (12) for receiving a second anchoring structure and a third opening (13, 14, 15) for receiving a third anchoring structure, the first, second, and third anchoring structures being attached in a mouth of a subject, and an intermediate structure (18) connecting the first, second and third openings, wherein one or more of the openings are stretchable, and wherein the intermediate structure and the openings are made from a creep resistant material.

9 Claims, 4 Drawing Sheets

(56) References Cited

U.S. PATENT DOCUMENTS

| | | | | |
|---|---|---|---|---|
| 3,961,421 | A * | 6/1976 | Wallshein | A61C 7/12 433/18 |
| 5,018,969 | A * | 5/1991 | Andreiko | A61C 7/16 433/20 |
| 5,080,584 | A * | 1/1992 | Karabin | A61C 7/02 433/20 |
| 5,474,444 | A * | 12/1995 | Wildman | A61C 7/12 433/18 |
| 7,335,021 | B2 | 2/2008 | Nikodem | |
| 10,136,966 | B2 * | 11/2018 | Reybrouck | A61C 7/287 |
| 2004/0096798 | A1 | 5/2004 | Cleary | |
| 2011/0027743 | A1 * | 2/2011 | Cinader, Jr. | A61C 7/30 433/10 |
| 2011/0033811 | A1 * | 2/2011 | Swain | A61C 7/282 433/10 |
| 2012/0225398 | A1 * | 9/2012 | Fallah | A61C 7/20 433/8 |
| 2015/0157421 | A1 * | 6/2015 | Martz | A61C 7/08 433/6 |
| 2015/0257856 | A1 * | 9/2015 | Martz | A61C 7/145 433/6 |
| 2018/0049847 | A1 * | 2/2018 | Oda | A61C 7/002 |

OTHER PUBLICATIONS

EPO Communication pursuant to Article 94(3) EPC dated Mar. 14, 2022 for European Patent Application No. 21722230.6, 5 pages.

* cited by examiner

ORTHODONTIC DEVICE

CROSS-REFERENCE

The present application is a continuation application of International Application No. PCT/EP2021/061431, filed on Apr. 30, 2021, which claims the benefit of and priority to European patent application n° 20 382 367.9 filed on May 4, 2020, the entire contents of which are hereby incorporated by reference.

The present disclosure relates to orthodontic devices, and particularly relates to orthodontic devices which are mounted to anchoring structures such as brackets. The present disclosure furthermore relates to kits and methods for orthodontic treatments.

BACKGROUND

The correction of dental irregularities and malocclusions by applying controlled forces to the teeth has become commonplace. For example, the use of orthodontic brackets is well known. Orthodontic brackets are typically bonded directly to the front of each tooth and come in a variety of styles and sizes, including self-ligating, lingual and titanium. The brackets act like handles that hold the arch wires that move teeth. Single elastics or ligatures are placed around the perimeter of the bracket securing the archwire. The bands need to be changed or adjusted at monthly appointments as the teeth continue to move.

An orthodontic treatment involving braces may be combined with the use of an orthodontic "power chain". Orthodontic power chains comprise connected elastic ligatures that are often used to close spaces between teeth during orthodontic treatment. This method typically uses a row of connected elastic O-rings that are attached to the bracket, causing uniform tension over several teeth. The tension facilitates a closing of the space between teeth or groups of teeth and is typically used toward the end of treatment. For example, US 2004/0096798 disclosed an orthodontic force module made of an elastomeric material.

Typically, an orthodontist will see a patient once a month or once every few weeks. At each visit, the orthodontist will adjust the brackets as needed for a treatment. Similarly, a suitable orthodontic power chain may be mounted around the brackets during those visits.

Orthodontic power chains are usually made from silicone rubber. Silicone rubber is used in many medical applications, and is thus biocompatible. Moreover, silicone rubber has good elastic properties. When mounting the orthodontic power chain, portions of the power chain are stretched. The openings of the power chain are arranged around brackets. The tension between subsequent openings of the power chain forces the teeth closer to each other.

Silicone rubber however has a number of disadvantages as well. Firstly, the power chain looses its activity or effectivity rather quickly, e.g. within a few days, under the influence of constant stress, saliva and humidity. So, in between visits to the orthodontist, the orthodontic power chain is hardly effective. Also, the colouring of the power chain may be affected under the influence of saliva. Furthermore, friction between silicone rubber and metal brackets is relatively high, affecting the effectiveness of the orthodontic treatment to resolve a patient's malocclusion.

The use of coil springs is also known. Open coil springs are used when two teeth are too close together. The coil spring goes over the arch wire and is used to move the teeth away from each other. Closed coil springs may have an eyelet at either end of the coil spring, and when stretched may pull teeth closer together.

US 2012/0058444 discloses a variable extension spring with two anchoring ends. US 2007/0196781 discloses an orthodontic tensions assembly, comprising a tensioner attachment body having a first end and a second end, wherein the first end of the tensioner attachment body has an opening adapted to removably receive a dental anchorage structure, and wherein the second end of the tensioner attachment body is adapted to removable couple a tensioning element.

The eyelets of coil springs may be fit around anchorage points, such as brackets cemented on teeth. When the coil spring is stretched upon mounting, the natural tendency of the spring is to shorten and thus to move teeth closer to each other. Multiple coil springs would have to be used simultaneously in order for multiple teeth to be pulled closer to each other.

The present disclosure in various examples provides methods, and devices for use in orthodontic treatments that at least partially resolve some of the aforementioned problems.

SUMMARY

In a first aspect, an orthodontic device is provided. The orthodontic device comprises a first opening for receiving a first anchoring structure, a second opening for receiving a second anchoring structure and a third opening for receiving a third anchoring structure, the first, second, and third anchoring structures being attached in a mouth of a subject. The device further comprises an intermediate structure connecting the first, second and third openings, wherein one or more of the openings are stretchable, and wherein the intermediate structure and the openings are made from a creep resistant material. The orthodontic device may be configured to deform by increasing its length and reducing its width.

In accordance with this aspect, the orthodontic device comprises at least three openings for mounting around anchoring structures, such as e.g. brackets. Multiple teeth can thus be moved with respect to each other. By making the orthodontic device from a creep resistant material the treatment can be much more effective than when using silicone rubber. The activity of the device can be maintained between visits to an orthodontist, which may be two-six weeks apart. And the activity may even be maintained for significantly longer than that, e.g. if two or more months pass between visits. And in some cases, the same device may be used throughout the entire treatment period. One or more, or all of the openings are stretchable and thus deformable, i.e. they change their shape when a tension is applied. They can therefore be fit around a variety of anchoring structures, in different portions of the mouth.

The orthodontic device is deformable particularly by lengthening of the structure by reducing the width of the structure. The device may be lengthened without significantly straining the material.

The orthodontic device may be deformable in the sense that a width of the device may be reduced by e.g. 25% or more, specifically 50% or more when stretched to fit around anchoring structures. In some examples, a width of the device may be reduced by 70% or more when stretched to fit around anchoring structures.

Creep, as used throughout the present disclosure, is the tendency of a solid material to move slowly or deform permanently under the influence of persistent mechanical stresses. It can occur as a result of long-term exposure to high levels of stress that are still below the yield strength of the material. Creep is more severe in materials that are subjected to heat for long periods and generally increases as they near their melting point. Creep can occur in polymers and metals.

A creep resistant material, as used throughout the present disclosure, may be understood as a material that does not show any significant creep behaviour at the temperature ranges and humid environment of a mouth of a user.

The openings and intermediate structure may be made from an elastic material.

An elastic material as used throughout the present disclosure may be understood as a material that allows a high degree of deformation before deforming plastically. In particular, the elastic limit i.e. the amount of strain a material can endure before plastic deformation occurs may be 5% or more, specifically 10% or more.

In some examples, the material may be a superelastic metallic material.

In some examples, the superelastic metallic material may be nitinol. Nickel titanium, also known as Nitinol, is a metal alloy of nickel and titanium, where the two elements are present in roughly equal atomic percentages. Different alloys are named according to the weight percentage of Nickel, e.g. Nitinol 55 and Nitinol 60. Nitniol 50 will have 50% Nickel by weight percentage and 50% Titanium. It exhibits the shape memory effect and superelasticity at different temperatures. Around body temperature, 37° C., Nitinol will typically show superelastic behaviour.

Depending on the alloy chosen, the transition temperature may be higher or lower. In some examples, the alloy may be chosen such that the transition temperature may be at a level, e.g. 50 or 60° C., such that the transition temperature may be reached intermittently. For example, when a patient drinks a cup of coffee or tea, the transition temperature may be reached, and when the temperature is reached, the material of the device will have a tendency to return to its original shape. Thus temporarily, a significant variation in force may occur.

In some cases, copper may be added to Nitinol. Copper can change the temperature at which the shape memory transition occurs.

In other examples, the device may be made from a high performance thermoplastic, such as polysulfones, Polyphenylene Sulfide (PPS), and e.g. polyketones like PEEK (polyether ether ketone).

In some examples, the device may be made from a single integrally formed body. In some examples, the intermediate structure and the openings may be formed by one or more woven or braided wires or wire bundles. In other examples, the orthodontic device may comprise a mesh. In examples wherein the openings and intermediate structure are formed from a single integral body, hooks, or other attachments may be avoided, which avoids e.g. impinging of parts on the cheeks of patients.

In a second aspect, an orthodontic device comprising a first opening for receiving a first anchoring structure, a second opening for receiving a second anchoring structure and a third opening for receiving a third anchoring structure is provided, wherein the first, second, and third anchoring structures are attached in a mouth of a subject. The device further comprises an intermediate structure connecting the first, second and third openings, wherein the openings and intermediate structure are made from a superelastic material, e.g. nitinol. The orthodontic device may be configured to deform by increasing its length and reducing its width.

In a third aspect, an orthodontic device comprising a first opening for receiving a first anchoring structure, a second opening for receiving a second anchoring structure and a third opening for receiving a third anchoring structure is provided, wherein the first, second, and third anchoring structures are attached in a mouth of a subject. The device further comprises an intermediate structure connecting the first, second and third openings, wherein the device reduces its width by 50% or more when fitted around the anchoring structure.

In a further aspect, a kit comprising an orthodontic device and a plurality of brackets is provided. The orthodontic device comprises a first opening for receiving a portion of a first bracket, a second opening for receiving a portion of a second bracket, and a third opening for receiving portion of a third bracket. The device is made a superelastic material e.g. nitinol. In use, the first, second, third (and further brackets) may be cemented on a patient's teeth. In use, the openings of the orthodontic device may be fitted around portions of the brackets. The orthodontic device may be configured to deform by increasing its length and reducing its width.

Any of the second, third and further aspects may, as for the first aspect, be combined with any of the features disclosed herein by way of example.

In any of these aspects, the first, second and third openings (and optionally further openings) may be aligned along a longitudinal axis of the orthodontic device, the longitudinal axis of the orthodontic device extending between one end and the opposite end of the longitudinal axis. In particular, the first, second, and third openings may be aligned along a central longitudinal axis. The central longitudinal axis may form a longitudinal axis of symmetry.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 5:
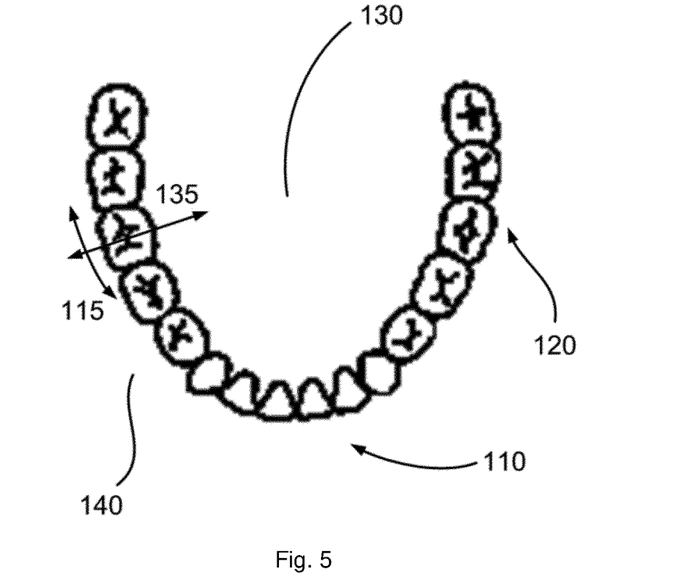
FIG. 5 schematically illustrates some terminology of the orthodontics field.

FIG. 5 schematically illustrates the arrangement of teeth in the lower jaw (mandible). A front portion of the mouth 110 may be referred to as a mesial region. A rear portion of the mouth 120 may be referred to as a distal region. In orthodontics, mesial and distal are terms used to refer to something being respectively closer to and further away from a central midline of the arch of teeth.

In the distal region of the mouth, the molar zone may be found. The molar zone may include a first molar, a second molar and possibly a third molar ("wisdom tooth"). An inner portion of the mouth behind the teeth 130 may be referred to as a lingual region (a region in which the tongue is located). An outer portion of the mouth 140 may be referred to as a labial region (a region in which the lips are located). A mesial-distal direction 115 with respect to a specific tooth (first molar) has been schematically indicated in FIG. 1. Also indicated in FIG. 5 is a lingual-labial direction 135 with respect to the same tooth. This terminology will be adhered to in the present disclosure.

Even though a mandible is illustrated in this particular figure, it should be clear that the same terminology applies to the maxilla.

Figure 1A:
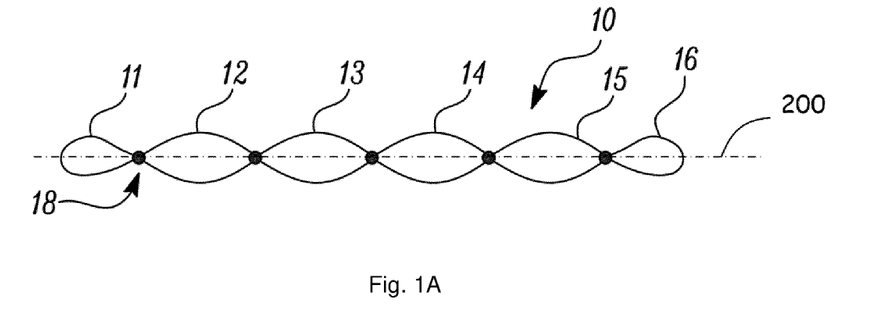
FIGS. 1A and 1B schematically illustrate two examples of an orthodontic device according to the present disclosure.

FIG. 1A schematically illustrates a first example of an orthodontic device 10. The orthodontic device 10 defines a longitudinal axis 200. The orthodontic device 10 comprises, a first opening 11 for receiving a first anchoring structure, a second opening 12 for receiving a second anchoring structure and a third opening 13 for receiving a third anchoring structure. In this example, there are additional openings 14, 15, 16 for receiving further anchoring structures. All openings may be substantially aligned along the central longitudinal axis 200. The orthodontic device may be substantially symmetrical along the central longitudinal axis 200.

The first, second, and third anchoring structures (and further structures) are attached in a mouth of a subject. The anchoring structures may be e.g. hooks, TADs (temporary anchorage devices), and/or (parts of) brackets arranged on teeth of a patient. In yet further examples, the anchoring structures may be attachments of aligners (shells fitting around an arch of teeth). Brackets may have e.g. hooks that can be used as anchoring structures, but other possible anchoring structures include e.g. wings arranged around an archwire (channel) or other orthodontic appliances, such as a Carriere® Motion appliance.

The orthodontic device 10 further comprises an intermediate structure connecting the first, second and third openings, wherein the first, second and third openings are stretchable, and the device 10 is deformable. When a user pulls on either end of the device, the device 10 deforms elastically i.e. when the force is removed, it returns to its original shape. When tension is applied, the openings 11, 12, 13 will deform and become flatter i.e. less wide, and longer. A significant change in overall length of the device may be obtained without necessarily a significant elongation of the material.

The intermediate structure and the openings may be made from an elastic material, and specifically from a superelastic metallic material.

The orthodontic device 10 in this example is made from a woven wire. The orthodontic device is made from a single integrally formed body avoiding hooks, appendices, and attachments which might damage or hurt an inside of a patient's mouth. The wire forms both the openings that can receive the anchoring structures and the intermediate structure in between the openings. In an alternative example, instead of a single woven wire, a wire bundle may be used.

Weaving as used herein may be interpreted as passing lengths or strands of material over and under one another and any form of interlacing a thread or wire to form a pattern. Weaving as used throughout the present disclosure is meant to encompass e.g. braiding and knitting.

In the example, the cross-over junctions 18 of the wires between openings 11-15 are welded. Welding or soldering these cross-over junctions of the wire or wire bundle provides fixation points and limits the stretching of the openings and thereby help the openings to maintain their original shape. In an alternative example, one or more of these junctions where wires cross-over may be fixed by silicone or metal rings. The rings around the junctions may allow for some displacement of wires within the rings. A further alternative is for a portion of the wire to be twisted around another portion of the wire at the junctions. The junctions may include a single or a double twist to ensure the junctions stay in place.

In the example of FIG. 1A, six openings are provided. So, the orthodontic device 10 may be fitted around as many as six different anchoring points. In some examples, not all the openings need to be fitted around an anchoring structure. E.g. only the openings at the ends of the device may be used. Or the openings at the ends of the device and one or more openings in between.

Figure 1B:
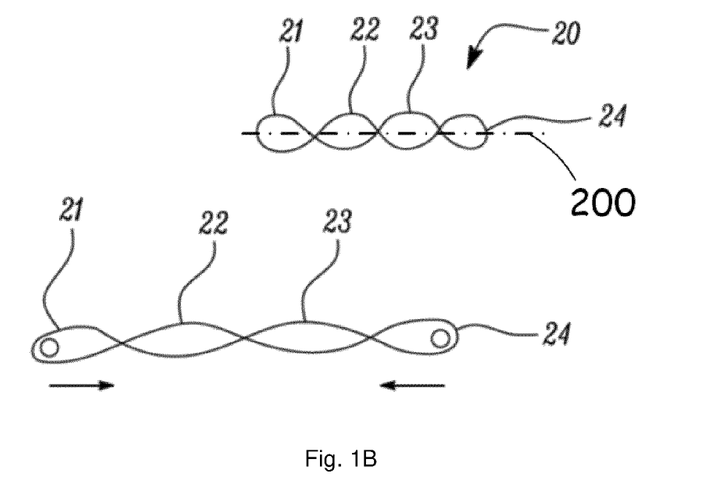

FIG. 1B shows an example of an orthodontic device in a first retracted or "collapsed" state, and the same device in a second, "expanded" state. The orthodontic device 20 might be manufactured, sterilized, packaged and delivered to an orthodontist or dentist in the retracted state. The retracted state may be the natural state of the device, i.e. the state to which the device will recur in the absence of any external forces on the device. The expanded state (this state may also be referred to as "extended" state or "stretched" state) represents the device once it is positioned around anchoring points in the mouth of a patient.

In the example of FIG. 1B, four openings 21, 22, 23, 24 are provided and the device 20 is made from a single wire or single bundle of wires. The intermediate structure in between the openings is, in the same manner as for the example of FIG. 1A, formed by cross-over junctions of the wire or wire bundle. And the openings and intermediate structure are once again made from a single integral structure. Also in this example, the openings are arranged along a central longitudinal axis 200. The orthodontic device has a central longitudinal axis of symmetry.

As opposed to the example of FIG. 1A, the cross-over junctions of the wires are not soldered or bound in this example. In the expanded state shown in FIG. 1B, anchoring points are schematically illustrated at either end of the device. Because the device 20 has been expanded to fit around the anchoring structure, it will have a tendency to shorten or retract to its natural state. This will provide a force on the anchoring points to move closer to each other. If the anchoring points are e.g. provided on teeth within the same arch (i.e. maxilla or mandible), then this will provide a force to move the teeth closer to each other.

In the examples of FIGS. 1A and 1B, all openings 11-16, 21-24 are formed by crossing over of wire(s). The wire or bundle of wires forms an endless loop.

In the examples, all openings have substantially the same size. When these devices are elongated, the openings 11, 16, 21, 24 at opposite ends may deform less than the openings in the centre. That is, the openings 11, 16, 21 and 24 at opposite ends will remain wider and shorter than the openings in the centre. In further examples, the openings may not all have the same size. In particular, the openings at opposite ends may be less wide than other openings of the same device.

Figure 1C:
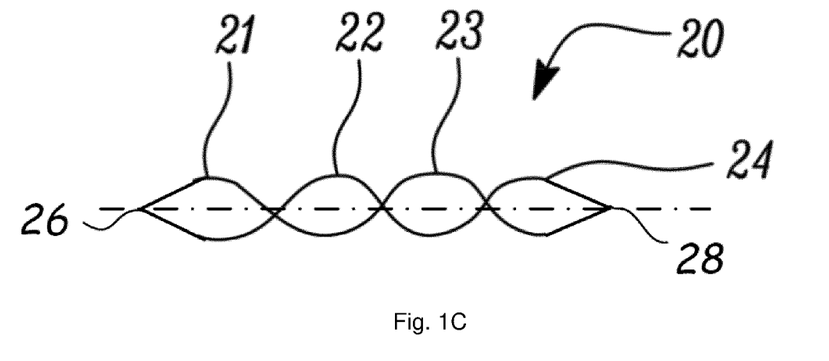
FIG. 1C schematically illustrates a further example of an orthodontic device.

FIG. 10 schematically illustrates another example of an orthodontic device. The orthodontic device of FIG. 10 is generally similar to the example of FIG. 1B, including four openings 21-24 formed by crossing over of wires. In the example of FIG. 10, the orthodontic device is formed by welding at ends 26, 28 at either end of two wires. In between the ends, the two wires are woven in the sense described before. The openings at the opposite ends of the device have a sharpened, straight ends extending in a longitudinal direction, as compared to the more rounded openings in the middle. The extension in the longitudinal direction may help elongating or stretching the orthodontic device, and particularly, the openings at both ends in a longitudinal direction.

Figure 2A:
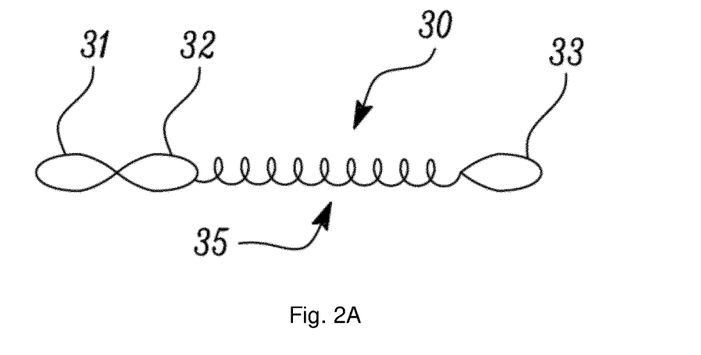
FIGS. 2A-2C schematically illustrate further examples of orthodontic devices.
Figure 2B:
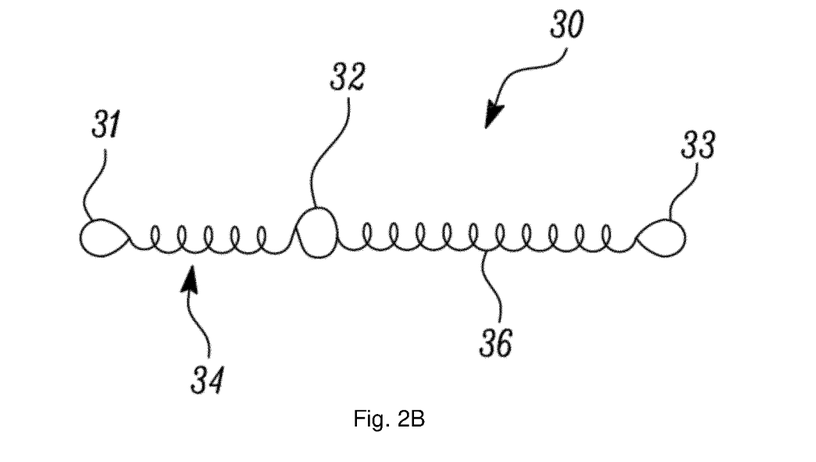
Figure 2C:
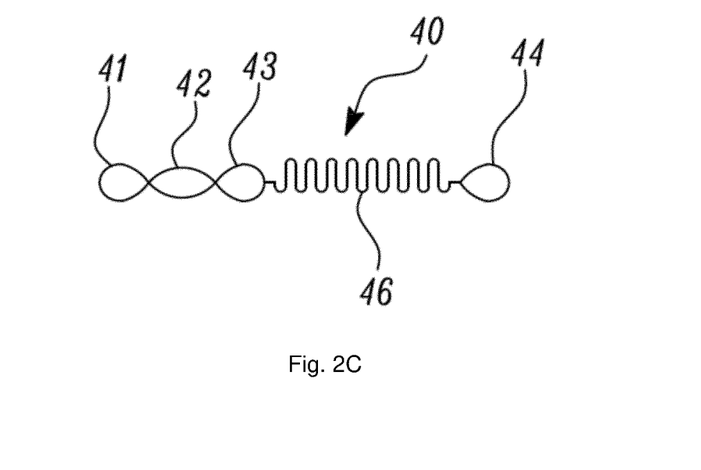

FIGS. 2A-2C illustrate further example of orthodontic devices. In the example of FIG. 2A, two openings 31, 32 are provided at one end, and a third opening 33 is provided at the opposite end. In between the opening 32 and opening 33, a helical coil spring is provided forming the intermediate structure in between the second and third opening. The coil spring and openings may be made as before from Nitinol. The coil spring 35 may be welded, soldered or brazed at either end to the openings. The helical coil spring may have a larger capacity to expand before plastic deformation than the purely braided structure of FIG. 1.

FIG. 2B shows an alternative example, which is similar to FIG. 2A, but instead of a single helical coil spring, two helical coil springs 34, 36 are provided between the first opening 31 and second opening 32, and between the second opening 32 and third opening 33. The connector in the non-stretched state (in this case a helical coil spring) in between the first and second opening may have a different length than the connector (also a helical coil spring in this specific example) between the second opening 32 and third opening 33.

The example of FIG. 2C is again slightly different. In this example four openings 41, 42, 43 and 44 are provided, each for receiving and fitting around an anchoring structure or anchoring point. The intermediate structure 46 between the third opening 43 and fourth opening 44 is again formed by a spring. Rather than a coil spring, a serpentine spring is used. A serpentine spring may reduce the risk of hurting an inside of a mouth of a patient.

Figure 3A:
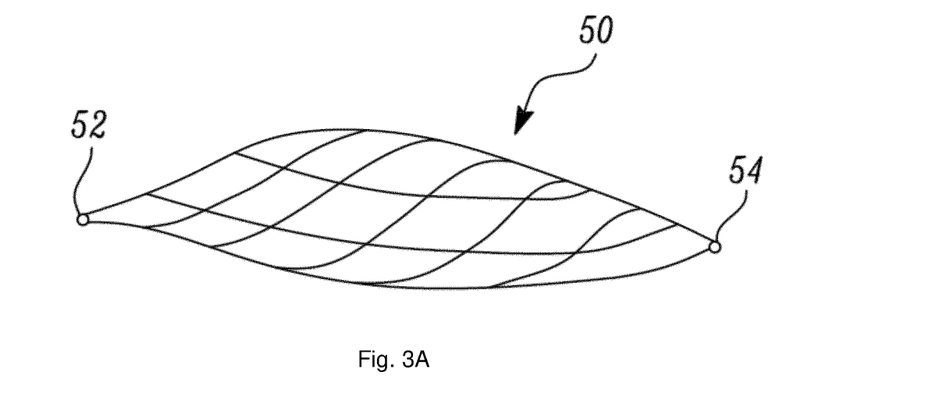
FIGS. 3A and 3B schematically illustrate yet a further example.
Figure 3B:
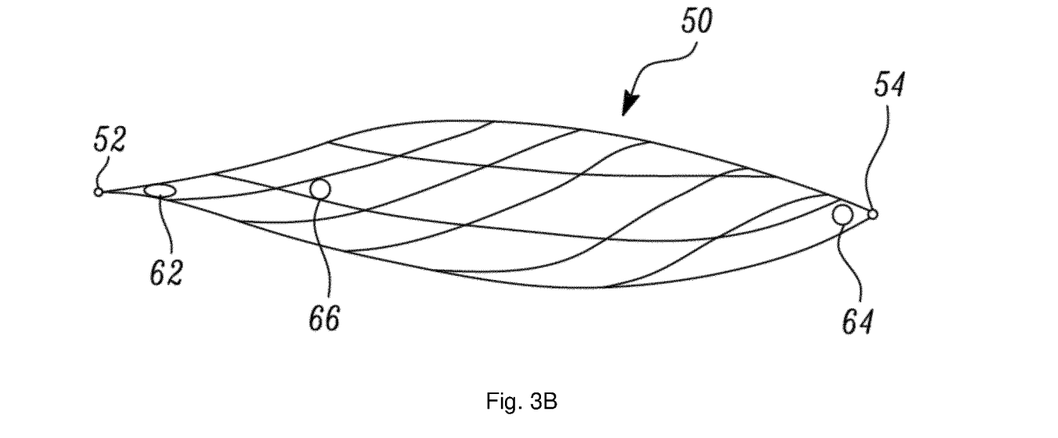

Yet a further alternative is shown in FIGS. 3A and 3B. FIG. 3A shows a device 50 made of a Nitinol mesh structure in its "natural" or retracted state. The mesh forms both the openings and the intermediate structure connecting them. The mesh may be woven, knitted or braided. The ends of the mesh 52, 54 may be welded.

Instead of welding the ends of a mesh, the ends may be glued.

FIG. 3B shows the same device 50 in an expanded state. It should be clear that a single device can have different expanded states. I.e. depending on the specific application, the device may be stretched to different extents in order to fit around the anchoring points. In the example of FIG. 3B, three anchoring points are shown: anchor 62 at one end, anchor 64 at the opposite end and an intermediate anchor 66.

An aspect of a mesh structure such as the one shown in FIG. 3 is that many openings that can potentially fit different anchoring structures are included. This makes the mesh structure very versatile and suitable for widely different treatments.

Figure 4:
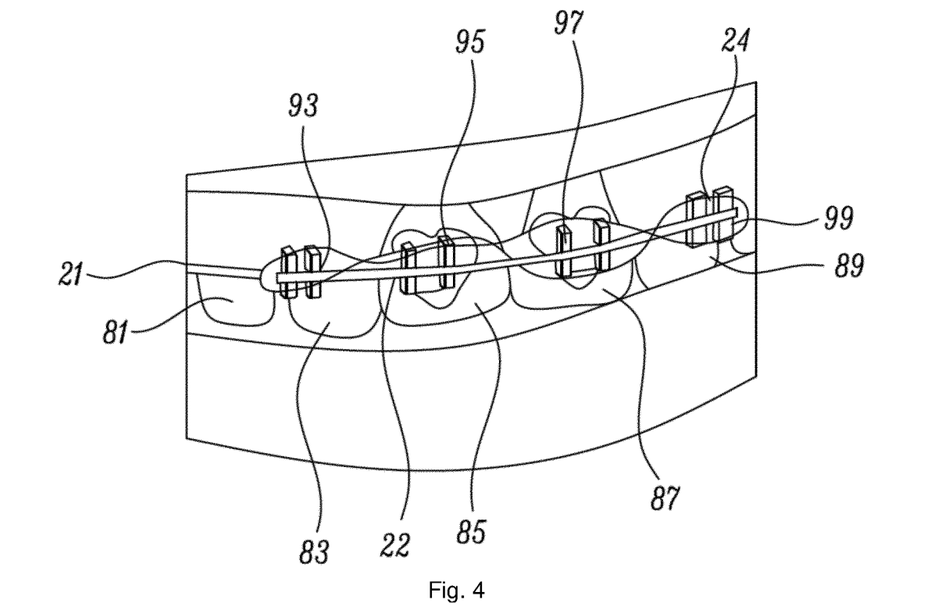
FIG. 4 schematically shows an example of an orthodontic device arranged around brackets in the mouth of a patient.

FIG. 4 shows an example of implementation of an orthodontic device resembling the examples of FIG. 1, i.e. devices wherein openings and intermediate structure are formed by braiding or weaving a wire or bundle of wires. The implementation shown resembles the traditional use as an orthodontic power chain.

FIG. 4 shows how the openings 21-24 of device 20 may be fit around different anchoring structures. FIG. 4 shows a segment of maxillary teeth, 81, 83, 85, 87, 89. Brackets 91, 93, 95, 97, 99 may be cemented on the consecutive teeth. Brackets 95, 97 and 99 are used as anchoring structures, and in particular, the wings surrounding the archwire slot function as anchoring structure. Teeth 85, 87 and 99 are thus pulled closer together.

Bracket 93 and tooth 83 is not used as anchoring structure. Depending on the need of a specific treatment, it should be clear that not all consecutive brackets need to be used. By increasing the space between openings (and thus more stretching of the intermediate structure between two openings), the pulling forces may be increased.

In any of the examples disclosed herein, the anchoring points or anchoring structure may be parts of brackets or molar tubes, such as e.g. hooks, and also wings arranged around the archwire slot. In all examples illustrated herein, the openings of the device for receiving an anchoring structure are at least partially rounded. I.e. part of the opening is substantially round, spherical, ovaloid or elliptical.

In any of the examples disclosed herein, the wires or bundles of wires forming the openings or/mesh may have a variety of cross-sections. Also, the cross-section may not be constant along the entire device. Both in dimensions, and in shape, the cross-section may vary. By varying the cross-section, local weaknesses of local rigidities may be provided such that the orthodontic device deforms in use a tailored manner.

In any of the disclosed examples, the openings that are configured to receive anchoring structures may be aligned substantially along a longitudinal axis of the orthodontic device. I.e. a centre point of each of the openings may substantially lie on the longitudinal axis, and particularly on a central longitudinal axis.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method comprising:
providing an orthodontic device having a single integrally formed body made from a superelastic material, and comprising a first opening, a second opening, and a third opening, wherein the first, second and third openings are made from a single wire or single wire bundle and passing portions of the single wire or single wire bundle over or under other portions of the single wire or single wire bundle;
attaching a first bracket to a first tooth,
attaching a second bracket to a second tooth,
attaching a third bracket to a third tooth,
securing an archwire to the first, second, and third brackets, and
mounting the orthodontic device around the first, the second and the third bracket by
fitting the first opening over wings of the first bracket,
fitting the second opening over wings of the second bracket, and
fitting the third opening over wings of the third bracket, and
wherein the mounting of the orthodontic device around the first, the second and the third bracket comprises applying tension to the orthodontic device to stretch the orthodontic device, such that the first, the second and the third teeth are pulled closer together after the tension is released.

2. The method according to claim 1, wherein prior to applying tension to the orthodontic device, the first, second and third openings are aligned along a longitudinal axis of the orthodontic device, the longitudinal axis of the orthodontic device extending between one end and the opposite end of the orthodontic device.

3. The method according to claim 1, wherein the superelastic material is a superelastic metallic material.

4. The method according to claim 3, wherein the superelastic metallic material is nitinol.

5. The method according to claim 1, wherein the orthodontic device further comprises an intermediate structure connecting the first, second and third openings.

6. The method according to claim 1, wherein cross-over junctions are formed where portions of the single wire or single wire bundle pass over other portions of the single wire or single wire bundle, and wherein one or more cross-over junctions of the single wire or wire bundle are welded.

7. The method according to claim 1, wherein the orthodontic device comprises further openings for receiving further brackets.

8. A method for treating a malocclusion in a mouth of a patient comprising:
   providing an orthodontic device having a central longitudinal axis of symmetry and being made of a single nitinol wire or a single nitinol wire bundle, wherein a first opening, a second opening, and a third opening of the orthodontic device are formed by weaving portions of the single nitinol wire or the single nitinol wire bundle, and wherein the first, the second, and the third opening are arranged along the central longitudinal axis,
   attaching a first anchoring structure in the mouth of the patient,
   attaching a second anchoring structure in the mouth of the patient,
   attaching a third anchoring structure in the mouth of the patient, and
   fitting the orthodontic device around the first, the second and the third anchoring structures such that a portion of the first anchoring structure is received in the first opening of the orthodontic device, a portion of the second anchoring structure is received in the second opening of the orthodontic device, and a portion of the third anchoring structure is received in the third opening of the orthodontic device,
   wherein the fitting of the orthodontic device comprises stretching the orthodontic device to increase a length of the orthodontic device such that the first, the second, and the third anchoring structures are pulled closer together after the fitting of the orthodontic device.

9. The method of claim 8, wherein the orthodontic device is made from a single integrally formed body.

* * * * *

UNITED STATES PATENT AND TRADEMARK OFFICE
CERTIFICATE OF CORRECTION

| | | |
|---|---|---|
| PATENT NO. | : 11,759,292 B2 | Page 1 of 1 |
| APPLICATION NO. | : 17/568616 | |
| DATED | : September 19, 2023 | |
| INVENTOR(S) | : Luis Carriere Lluch | |

It is certified that error appears in the above-identified patent and that said Letters Patent is hereby corrected as shown below:

On the Title Page

Item (30):
Please add the Foreign Application Priority Data, as follows:
--May 4, 2020 (EP) ...........................20382367--

Signed and Sealed this
Fifteenth Day of October, 2024

Katherine Kelly Vidal
*Director of the United States Patent and Trademark Office*